United States Patent
Caskey et al.

(10) Patent No.: US 9,244,441 B2
(45) Date of Patent: *Jan. 26, 2016

(54) SYSTEM AND METHOD FOR USING BIOMETRICS TO PREDICT AND SELECT MUSIC PREFERENCES

(71) Applicant: International Business Machines Corporation, Armonk, NY (US)

(72) Inventors: Sasha P. Caskey, New York, NY (US); Dimitri Kanevsky, Ossining, NY (US); Sameer R. Maskey, New York, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/679,407

(22) Filed: Nov. 16, 2012

(65) Prior Publication Data

US 2014/0119564 A1 May 1, 2014

Related U.S. Application Data

(63) Continuation of application No. 13/660,510, filed on Oct. 25, 2012.

(51) Int. Cl.
  *A61B 5/021* (2006.01)
  *A61B 5/0476* (2006.01)
  *A61B 5/0482* (2006.01)
  *A61B 5/0488* (2006.01)
  *A61B 5/01* (2006.01)
  *G05B 1/01* (2006.01)
  *G06F 17/30* (2006.01)

(52) U.S. Cl.
  CPC ............ *G05B 1/01* (2013.01); *G06F 17/30764* (2013.01)

(58) Field of Classification Search
  CPC .. A61B 5/486; A61B 5/6802; A61B 5/02055; B60H 1/00735; G06F 17/30764
  USPC ............ 381/86, 118; 600/300, 481, 544–546, 600/549
  See application file for complete search history.

(56) References Cited

U.S. PATENT DOCUMENTS

| | | | |
|---|---|---|---|
| 6,084,516 A * | 7/2000 | Yasushi | A61B 5/0002 340/4.14 |
| 6,623,427 B2 | 9/2003 | Mandigo | |
| 2004/0218768 A1* | 11/2004 | Zhurin | H03G 3/32 381/107 |
| 2006/0155175 A1* | 7/2006 | Ogino | A61B 5/02438 600/301 |

(Continued)

FOREIGN PATENT DOCUMENTS

WO 2010035227 A1 4/2010

*Primary Examiner* — Duc Nguyen
*Assistant Examiner* — George Monikang
(74) *Attorney, Agent, or Firm* — Anne V. Dougherty; Ryan, Mason & Lewis, LLP

(57) ABSTRACT

Systems and methods for using biometrics to select music preference are provided. A system for using biometrics to select music preferences for a user in a vehicle, comprises a music selection module electrically coupled to at least one biometric sensor in the vehicle, wherein the at least one biometric sensor senses a characteristic of the user and outputs data for the sensed characteristic to the music selection module, and wherein the music selection module selects a music selection for the user based on the sensed characteristic data, and a controller module electrically coupled to the music selection module to control playing of the music selection, wherein the controller module receives an output including the music selection from the music selection module.

16 Claims, 5 Drawing Sheets

(56) References Cited

U.S. PATENT DOCUMENTS

| | | | | |
|---|---|---|---|---|
| 2007/0106672 A1* | 5/2007 | Sighart | ............ | G06F 17/30867 |
| | | | | 1/1 |
| 2008/0281895 A1* | 11/2008 | McKinney et al. | ........... | 708/424 |
| 2009/0270170 A1 | 10/2009 | Patton | | |
| 2010/0211439 A1 | 8/2010 | Marci et al. | | |
| 2011/0187516 A1* | 8/2011 | Makinen | ............... | B60W 50/16 |
| | | | | 340/425.5 |

* cited by examiner

SYSTEM AND METHOD FOR USING BIOMETRICS TO PREDICT AND SELECT MUSIC PREFERENCES

CROSS-REFERENCE TO RELATED APPLICATION

This application is a Continuation of U.S. application Ser. No. 13/660,510, filed on Oct. 25, 2012, the disclosure of which is incorporated herein in its entirety by reference.

TECHNICAL FIELD

The field generally relates to systems and methods for using biometrics to predict and select music preferences and, in particular, systems and methods for using biometrics to predict and select music preferences for a vehicle occupant.

BACKGROUND

When listening to music, such as while driving in a car or at work, users often change to a different radio station or song if a musical selection does not appeal to them. Known systems, such as PANDORA, RHAPSODY and LAST.FM attempt to organize or utilize users' music preferences based on, for example, artists, reviews, and songs in users' libraries. With these known systems, explicit information and feedback from the users in the form of, for example, selection of preferred artists and songs, and purchase of songs, is required to develop and work with users' preferences and improve the listening experience.

Other known systems access a user's electronic collection of audio or video recordings to determine an audio/video preference profile for a user, and/or receive preference information from a user and adapt at least a portion of the preference information into at least one theme.

SUMMARY

In general, exemplary embodiments of the invention include systems and methods for using biometrics to select music preferences and, in particular, systems and methods for using biometrics to predict and select music preferences for a vehicle occupant.

According to an exemplary embodiment of the present invention, a system for using biometrics to select music preferences for a user in a vehicle, comprises a music selection module electrically coupled to at least one biometric sensor in the vehicle, wherein the at least one biometric sensor senses a characteristic of the user and outputs data for the sensed characteristic to the music selection module, and wherein the music selection module selects a music selection for the user based on the sensed characteristic data, and a controller module electrically coupled to the music selection module to control playing of the music selection, wherein the controller module receives an output including the music selection from the music selection module.

The characteristic may be at least one of a pulse rate, a body temperature, a facial expression and a body movement. The biometric sensor may comprise at least one of a pressure sensor, a motion sensor, a pulse rate sensor, a temperature sensor and a camera.

The music selection module may receive environmental data and selects the music selection for the user based on the sensed characteristic data and the environmental data. The environmental data may be at least one of a day of a week, a time of the day, weather, season and driving route.

A database of previously analyzed biometric data may be electrically coupled to the music selection module, wherein the music selection module selects the music selection for the user based on the sensed characteristic data and the previously analyzed biometric data.

The music selection module may comprise at least one of a biometric sensor interpreter, a gesture analyzer, and an emotion classifier.

The music selection module may comprise a searching module capable of searching at least one of a database and FM frequencies for a matching or similar music selection to the selected music selection. The searching module may search for music selections according to a music classification pattern.

The music selection module may comprise a filter including a pattern recognition tool to analyze models of biometric data applied on the filter, wherein the filter outputs a prediction of music selections for the user based on the models. The models may include personalized user models developed during a training phase. The models may be developed from reaction variant patterns, wherein the reaction variant patterns are based on linear combinations of other patterns. The pattern recognition tool may further analyze environmental data to output the prediction of music selections based on the environmental data.

According to an exemplary embodiment of the present invention, a method for using biometrics to select music preferences for a user in a vehicle, comprises monitoring the vehicle for an input from a biometric sensor, determining whether any inputs from the biometric sensor have been detected, determining whether a music selection is being played, interpreting the input from the biometric sensor to predict whether the sensory input indicates satisfaction with the music selection being played, and selecting another music selection other than the music selection being played based on the interpretation of the input from the biometric sensor.

The method may further comprise playing the other music selection in place of the music selection being played if it is determined that the sensory input does not indicate satisfaction with the music selection being played.

The method may further comprise playing the other music selection after the music selection being played ends if it is determined that the sensory input indicates satisfaction with the music selection being played.

The input from the biometric sensor may comprise at least one of a pulse rate, a body temperature, a facial expression and a body movement.

The method may further comprise analyzing environmental data and selecting the other music selection based on the interpretation of the input from the biometric sensor and the environmental data. The environmental data may be at least one of a day of a week, a time of the day, weather, season and driving route.

The method may further comprise selecting the other music selection based on the interpretation of the input from the biometric sensor and previously analyzed biometric data.

The method may further comprise analyzing models of biometric data applied on a filter, wherein the filter outputs a prediction of music selections for the user based on the models. The models may be developed from reaction variant patterns based on linear combinations of other patterns.

According to an embodiment of the present invention, an article of manufacture comprises a computer readable storage medium comprising program code tangibly embodied thereon, which when executed by a computer, performs method steps for using biometrics to select music preferences for a user in a vehicle, the method steps comprising monitoring the vehicle for an input from a biometric sensor, determining whether any inputs from the biometric sensor have been detected, interpreting the input from the biometric sensor, analyzing environmental data, and selecting a music selection based on the interpretation of the input from the biometric sensor and the environmental data.

According to an embodiment of the present invention, an apparatus for using biometrics to select music preferences for a user in a vehicle, comprises a memory, and a processor coupled to the memory and configured to execute code stored in the memory for monitoring the vehicle for an input from a plurality of biometric sensors, determining whether any inputs from the biometric sensors have been detected, interpreting the inputs from the biometric sensors to develop models of biometric data, applying and analyzing the models of the biometric data on a filter, and outputting a prediction of music selections for the user based on the models.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for using biometrics to select music preferences and, in particular, systems and methods for using biometrics to select music preferences for a vehicle occupant. This invention may, however, be embodied in many different forms and should not be construed as limited to the embodiments set forth herein.

Users behave differently when they like or dislike a musical selection, such as a song, and this behavior can be quantitatively measured through different biometric measurements. Biometric measurements measure, for example, physiological and behavioral characteristics including, but not limited to, an individual's voice, movements, gestures, expressions, posture, etc.

Embodiments of the present invention use biometric information to determine when a user likes or dislikes a musical selection. As a result, music can be automatically adjusted based on the user's behavior and mood.

For example, according to an embodiment, when in a vehicle, such as a car, bus, truck, boat, airplane, etc., a song selection module (e.g., 105 in FIG. 1) can use information such as movements on the vehicle seats, pressure, temperature and humidity levels on the steering wheel or armrests, facial expressions, gestures, etc., to determine whether a user, such as the driver or a passenger in the vehicle, likes or dislikes musical selections. Users tend to provide implicit physical feedbacks when they like something, and these feedbacks can be measured using biometric sensors. Such feedbacks include, but are not limited to shaking one's body with the beat of the music and tapping a steering wheel when a user/driver likes a song.

Various biometric sensors are placed around the user(s) to measure quantities including, but not limited to, voice level, pulse rate, hand temperature, facial expressions (e.g., happy/sad) and body movements, including, but not limited to, tapping one's hands or feet, snapping fingers and bobbing one's head. Sensors may include, but are not limited to, pressure, motion, pulse rate and/or temperature sensors, located, for example, on the steering wheel, seat and/or any other surface in the vehicle, microphones and video and/or still image cameras located, for example, in or on the dashboard, visor, rearview mirror, window, radio and/or at a user's feet.

Figure 3:
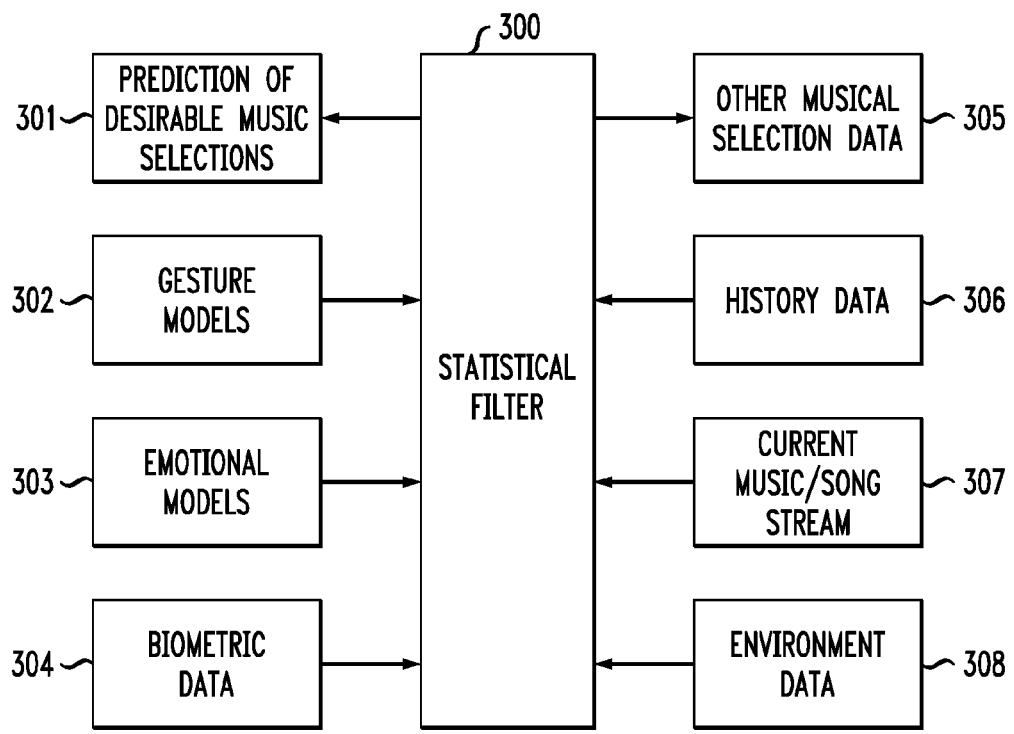
FIG. 3 is high-level diagram illustrating an operation of a statistical filter in a system for predicting and selecting music preferences according to an exemplary embodiment of the invention.

According to an embodiment, an initial training phase begins where the system learns what musical selections a user likes and dislikes under various biometric measurements, by using, for example, a machine learning algorithm. In accordance with an embodiment of the present invention, data concerning what a user likes and dislikes can be input to a machine learning algorithm as labels and processed using pattern recognition techniques. Like what is shown in FIG. 3, the data analyzed according to the machine learning algorithm during the initial training phase may include, but is not limited to, data from one or more sensors, cameras and microphones, previously analyzed or categorized data results, the current music/song stream and environment data. In accordance with an embodiment of the present invention, models and history data for analysis by a statistical filter 300 can be developed during the initial training phase.

According to an embodiment, once learning is completed, the system continuously measures biometric data from the user to determine what musical selections to play. For example, if the system detects the listener(s) are unhappy with the current selection, the system will note the data, and try to find a better song to play. In another example, if a user starts dancing in place to a certain song, the system will note the user's activity and update its models and history data that can be input into a statistical filter 300. In accordance with an embodiment, if the system puts on a musical selection that it has determined that a user will like, and a user changes or cancels the musical selection selected by the system, the system can recognize that a potential mistake has been made, as indicated by the user changing the song. The machine learning algorithm then updates its parameters with new information as to what biometric measurements indicate a wanted or unwanted musical selection.

According to an embodiment, in a modeling method for collecting and analyzing users' biometric information, reaction variant patterns are used to predict users' music preferences. Reaction variant patterns are variations in patterns detected from users, and are based on linear combinations of other patterns.

More specifically, according to an embodiment, there is an existing set of reaction patterns (for example, tap, nod, and jump) that have been already categorized with some preferred music labels/titles. These reaction patterns are denoted as a matrix H with columns that represent the patterns. When new patterns are detected, for example, dance movements, which are not categorized under any preferred labels/titles, the new patterns are denoted as y. Then, a sparse solution in x is determined according to the linear equation y=Hx to find out which labels/titles most overlap with nonzero entries in x, where x is a selector. In other words, the uncategorized reaction patterns are related to the closest categorized reaction patterns, and the uncategorized reaction patterns are then categorized under the same labels/titles as their closest categorized reaction patterns.

The patterns can include, but are not limited to, gestures, body measurements (pulse, humidity, face expressions, emotions, voice, etc.). According to an embodiment, a modality sensor in a vehicle can be used to detect variations in patterns. In an example, a dance movement pattern, including the combination of tapping of fingers and an excited voice, can be defined as a reaction variant pattern.

According to embodiments of the present invention, reaction variant patterns are used to build a prediction model that predicts if a user likes a song. Based on such a prediction, a song that is similar to the current preferences can be played. Referring to FIG. 3, these prediction models can be input into the statistical filter 300 for processing.

According to an embodiment of the present invention, the biometric information that is collected is not limited to the driver, and biometric information of one or more passengers inside the vehicle can be used to predict the music that will be liked in the vehicle. For example, the system can analyze the biometric information of multiple individuals to develop their preferences and search for any overlapping musical selections that would be liked by the group. It is to be understood, that the collection of the biometric information from the passengers can be performed in a same or similar matter as that of the driver.

According to an embodiment, the system is also capable of learning a song classification pattern, for example, based on artist or genre, from reading biometric data from the driver and/or passengers and relating the read data to one or more classification patterns. The system uses the song classification pattern or variable to choose songs from a song list and/or from scanning radio stations looking for preferred songs falling within the classification pattern.

In accordance with an embodiment, features other than biometric measurements, including, but not limited to environmental factors, such as the day of the week, time of day, weather, season and driving route, are factored into the learning algorithm when creating the personalized models. The environmental information can be gathered using, for example, a camera, a global positioning system (GPS), internal calendars and/or wireless networks.

The system can also detect conversations between occupants in the vehicle and lower the volume of a musical selection if it detects that the occupants in a vehicle are in a conversation mode, and bringing the volume back up as the conversation ceases.

The system can also be used outside of a vehicle, by, for example, bicycle riders (with portable music systems like IPods® or IPhones®) and in other situations when users are running, walking or sitting and listening their portable music systems. According to an embodiment, the system is capable of playing music that is already available on a portable music system, and can also search a frequency range, such as the FM range, to find songs that will match a user's preferences based on the biometric and other data.

Figure 1:
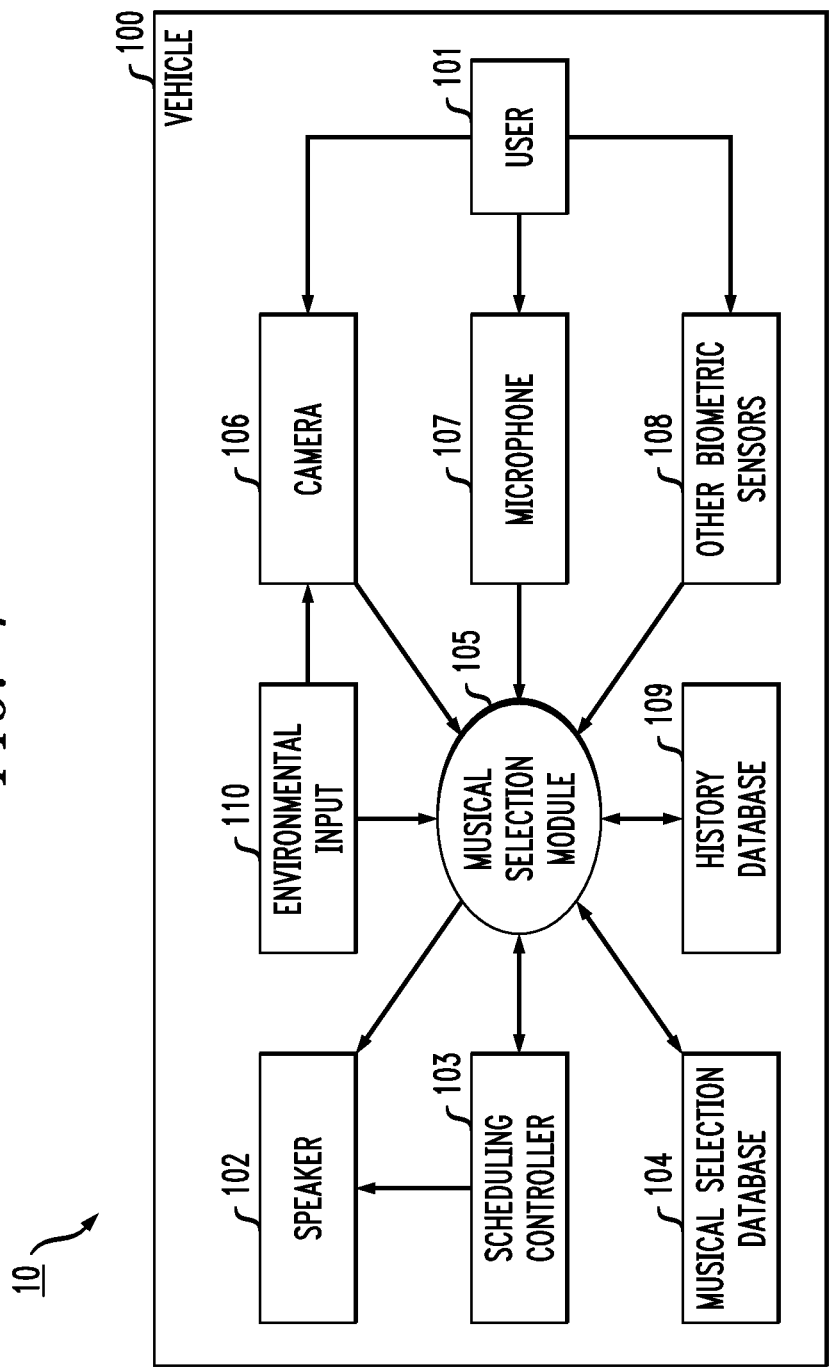
FIG. 1 is a high-level diagram of a system for predicting and selecting music preferences according to an exemplary embodiment of the invention.

Referring to FIG. 1, according to an embodiment of the present invention, the system 10 includes a vehicle 100, one or more users 101, a speaker 102, a musical selection scheduling controller 103, a database of musical selections 104 (e.g., songs and other music), a musical selection module 105, a camera 106, a microphone 107, other biometric sensors 108, a history database 109 including, for example, gestures, songs and other music, and an environmental input module 110, which gathers information on environmental factors, such as the day of the week, time of day, weather, season and driving route. The musical selection module 105 can be for example, a server, software, a processor, or any other module for performing the task of combining and analyzing the various factors and finding a musical selection to be played. The musical selection module can be located in the vehicle 100, or positioned remote from the vehicle 100, and accessed via a wireless network.

As can be seen in FIG. 1, the musical selection module 105 uses available data from a camera 106, microphone 107, other biometric sensors 108, a history database 109 of previously analyzed data of a user and/or the environment 110 to select, categorize and/or predict a musical selection that a user 101 likes. The musical selection module 105 can also take into account current or previously played music information from a scheduling controller 103, and draw music selections from a database 104 to be played via one or more speakers 102 in the vehicle 100. The musical selection module 105 also provides selected music data to the scheduling controller 103 for scheduling playing of a selection, to the database of musical selections 104 to update, for example, a song list, and to the history database 109 for future use and analysis. The scheduling controller 103 can be electrically coupled to a sound system in the vehicle 100 including speakers 102.

Figure 2:
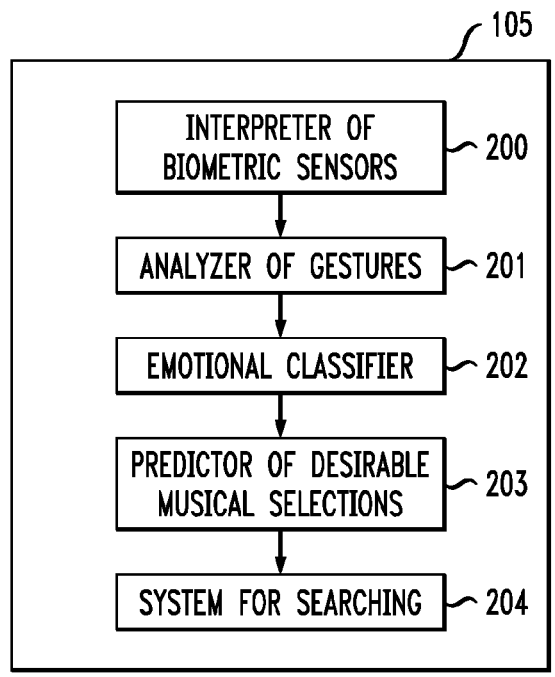
FIG. 2 is high-level diagram showing detail of a song selection module in system for predicting and selecting music preferences according to an exemplary embodiment of the invention.

Referring to FIG. 2, according to an embodiment of the present invention, the musical selection module 105 includes, but is not limited to, an interpreter of biometric sensors 200, analyzer of gestures 201, an emotional classifier 202, a predictor of desirable musical selections for a user 203, and a system for searching for musical selections 204. According to an embodiment, the interpreter of biometric sensors 200, the analyzer of gestures 201, and the emotional classifier 202 interpret the data from any one of the camera 106, microphone 107 or other biometric sensors 108 to determine a mood and/or reaction of the user 101. These elements 200, 201 and 202 may use the historical data from database 109 to make the determination. Once the determination of mood and/or reaction of the user is made, the predictor of desirable musical selections 203 predicts songs and music that a user 101 will like and not like based on the determination, as well as information from databases 104 and 109. The system for searching 204 then searches for matching or similar songs in the database 104 or on FM frequencies. As stated above, according to an embodiment, the system 204 may search based on a song classification pattern, such as artist or genre.

In an embodiment, the interpreter of biometric sensors 200 is electrically coupled to the analyzer of gestures 201, and the analyzer of gestures is electrically coupled to the emotional classifier 202. With this configuration, the interpreter of biometric sensors 200 can send an input result (e.g., a conclusion as to a type of gesture made) to the analyzer of gestures 201, which can analyze a gesture to determine, for example, whether the gesture indicates satisfaction or dissatisfaction. The emotional classifier 202 can receive an input result from the analyzer of gestures 201, and classify an emotional state of the user as, for example, happy or sad. With the predictor of desirable musical selections 203 electrically coupled to the emotional classifier, the emotional classification can then be used to predict a desired musical selection based on the emotional classification. The system for searching 204, which is electrically coupled to the predictor 203, then searches for matching or similar songs in the database 104 or on FM frequencies based on the output of the predictor 203.

Referring to FIG. 3, the musical selection module includes a statistical filter 300. The statistical filter 300 receives input in the form of gesture models 302, emotional models 303, biometric data 304, history data 306, the current music/song stream 307 and environment data 308, and outputs a prediction of desirable musical selections 301 and other musical selection data 305, which may include, for example, undesirable songs. According to an embodiment, the models 302, 303 include the personalized models developed during the initial training phase, and from the reaction variant patterns as discussed above. In addition, the models 302, 303 can also include generalized models based on general human behavior. The history data 306 includes, for example, prior determinations of liked musical selections based on biometric and environmental data that has been previously collected and analyzed. The statistical filter 300 also takes into account present biometric and environmental data 304, 308, as well as the instant music stream 307.

Figure 4:
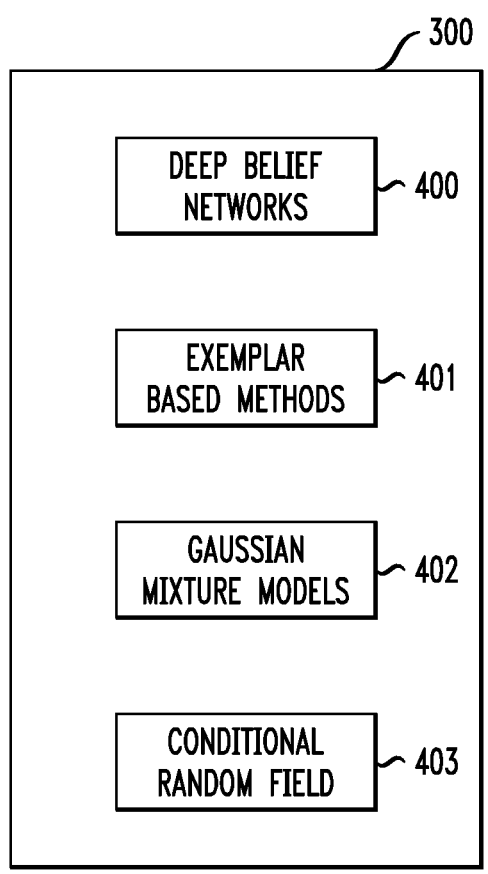
FIG. 4 is high-level diagram showing detail of a statistical filter in a system for predicting and selecting music preferences according to an exemplary embodiment of the invention.

Referring to FIG. 4, the statistical filter 300 uses one or more of the following pattern recognition tools: deep belief network 400, exemplar based methods 401, Gaussian mixture models 402, and conditional random fields 403. It is to be understood that the statistical filter is not limited to these pattern recognition tools, and other available probabilistic generative models, statistical modeling and/or probability functions may be used.

Figure 5:
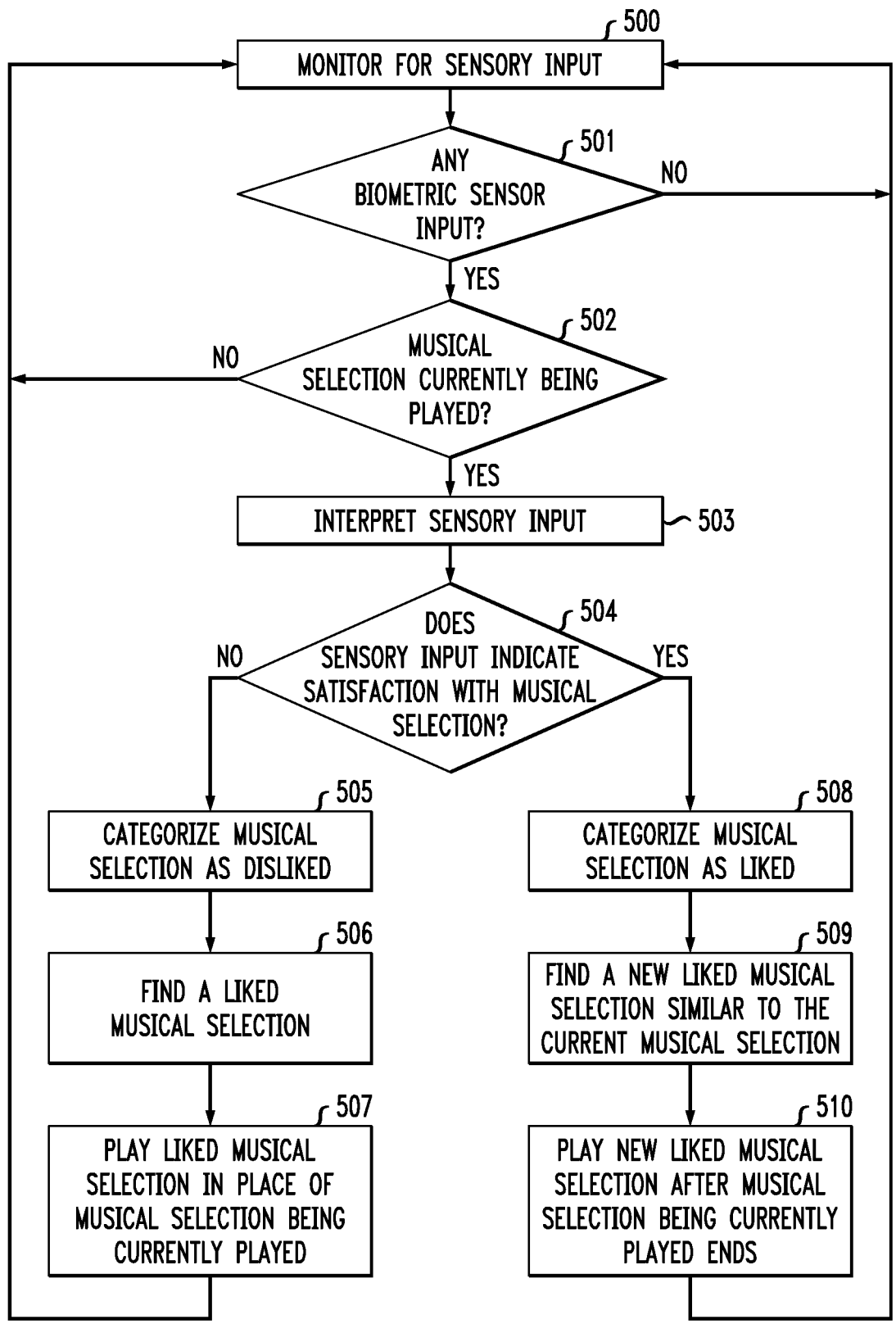
FIG. 5 is flow diagram of a method for predicting and selecting music preferences according to an exemplary embodiment of the invention.

Referring to FIG. 5, a method for predicting and selecting music preferences according to an exemplary embodiment of the invention is shown. At block 500, the system monitors for sensory input. At block 501, a determination is made as to whether any inputs from the camera 106, microphone 107 or other biometric sensors 108 have been detected. If the answer is no at block 501, the system continues to monitor for sensory input. If the answer is yes at block 501, then the system queries whether a musical selection is being played at block 502. If the answer is no at block 502, the system continues to monitor for sensory input. If the answer is yes at block 502, then the system interprets the sensory input at block 503, and queries at block 504 whether the sensory input indicates satisfaction or happiness with the musical selection. If the answer is no at block 504, the system categorizes the musical selection as one which the user dislikes at block 505, finds a new musical selection which has previously been determined as liked by the user at block 506, and plays the new musical selection in place of the current musical selection at block 507, at which point, the method returns to block 500. If the answer is yes at block 504, the system categorizes the musical selection as one which the user likes at block 508, finds a new musical selection which has previously been determined as liked by the user and is similar to the current musical selection at block 509, and plays the new musical selection after the current musical selection has ended at block 510, at which point, the method returns to block 500. According to an embodiment, the environmental factors may also be factored into the analysis at, for example, at blocks 503 and 504.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1, 2, 3, 4 and 5 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 6:
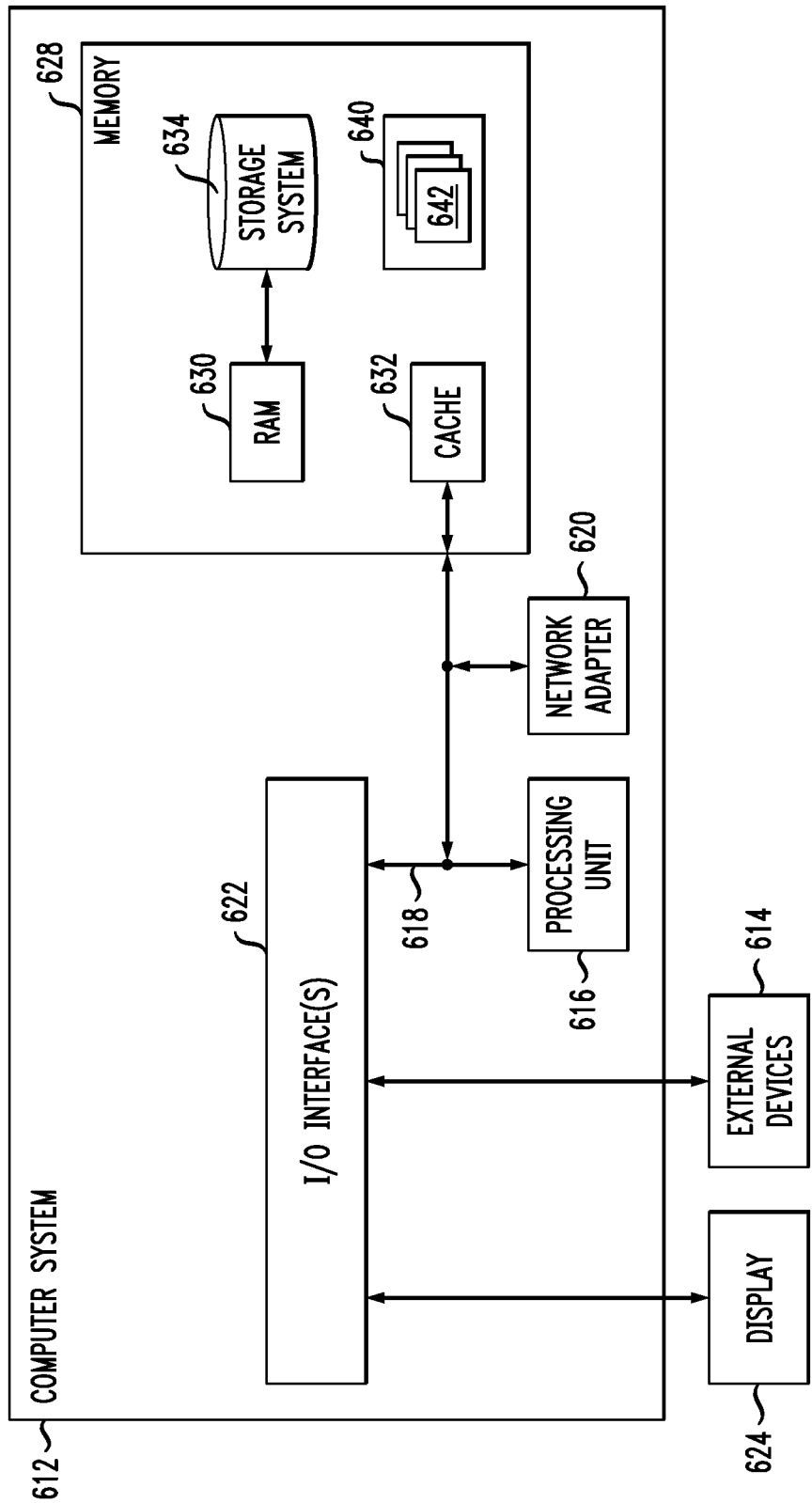
FIG. 6 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for using biometrics to select music preferences for a user in a vehicle, comprising:
    a music selection module electrically coupled to at least one biometric sensor in the vehicle, wherein the at least one biometric sensor senses a characteristic of the user and outputs data for the sensed characteristic to the music selection module, and wherein the music selection module:
        determines whether a music selection is being played;
        interprets the sensed characteristic data to predict whether the sensed characteristic data indicates satisfaction with the music selection being played;
        selects another music selection for the user other than the music selection being played based on the interpretation of the sensed characteristic data;
        categorizes the music selection being played as one the user likes or dislikes based on the interpretation of the sensed characteristic data;
        comprises a filter including a pattern recognition tool to analyze models of biometric data applied on the filter, wherein the filter outputs a prediction of music selections for the user based on the models, and the models are developed from reaction variant patterns;
        respectively categorizes existing reaction variant patterns under different music selections;
        detects uncategorized reaction variant patterns;
        determines to which categorized reaction variant patterns the uncategorized reaction variant patterns are closest; and
        categorizes the uncategorized reaction variant patterns under the same music selections as their closest categorized reaction variant patterns; and
    a controller module electrically coupled to the music selection module to control playing of the music selection, wherein the controller module:
        receives an output including the music selection from the music selection module;
        plays the other music selection in place of the music selection being played in response to a determination that the sensed characteristic indicates dissatisfaction with the music selection being played, and the categorization of the music selection being played as one the user dislikes; and
        plays the other music selection after the music selection being played ends in response to a determination that the sensed characteristic indicates satisfaction with the music selection being played, and the categorization of the music selection being played as one the user likes.

2. The system of claim 1, wherein the characteristic is at least one of a pulse rate, a body temperature, a facial expression and a body movement.

3. The system of claim 1, wherein the biometric sensor comprises at least one of a pressure sensor, a motion sensor, a pulse rate sensor, a temperature sensor and a camera.

4. The system of claim 1, wherein the music selection module receives environmental data and selects the other music selection for the user based on the interpretation of the sensed characteristic data and the environmental data.

5. The system of claim 4, wherein the environmental data is at least one of a day of a week, a time of the day, weather, season and driving route.

6. The system of claim 1, further comprising a database of previously analyzed biometric data electrically coupled to the music selection module, wherein the music selection module selects the other music selection for the user based on the interpretation of the sensed characteristic data and the previously analyzed biometric data.

7. The system of claim 1, wherein the music selection module comprises at least one of a biometric sensor interpreter, a gesture analyzer, and an emotion classifier.

8. The system of claim 1, wherein the music selection module comprises a searching module capable of searching at least one of a database and FM frequencies for a matching or similar music selection to the selected music selection.

9. The system of claim 8, wherein the searching module searches for music selections according to a music classification pattern.

10. The system of claim 1, wherein the pattern recognition tool further analyzes environmental data to output the prediction of music selections based on the environmental data.

11. The system of claim 1, wherein the models include personalized user models developed during a training phase.

12. The system of claim 1, wherein the reaction variant patterns are based on linear combinations of other patterns.

13. The system of claim 1, wherein the music selection module comprises a searching module capable of searching a plurality of radio stations for a matching or similar music selection to the selected music selection.

14. An article of manufacture comprising a non-transitory computer readable storage medium comprising program code tangibly embodied thereon, which when executed by a computer, performs method steps for using biometrics to select music preferences for a user in a vehicle, the method steps comprising: monitoring the vehicle for an input from a biometric sensor; determining whether any inputs from the biometric sensor have been detected; determining whether a music selection is being played; interpreting the input from the biometric sensor to predict whether the input from the biometric sensor indicates satisfaction with the music selection being played; analyzing environmental data; selecting another music selection other than the music selection being played based on the interpretation of the input from the biometric sensor and the environmental data; categorizing the music selection being played as one a user likes or dislikes based on the interpretation of the input from the biometric sensor and the environmental data; playing the other music selection in place of the music selection being played in response to a determination that the input from the biometric sensor indicates dissatisfaction with the music selection being played, and the categorization of the music selection being played as one the user dislikes; playing the other music selection after the music selection being played ends in response to a determination that the input from the biometric sensor indicates satisfaction with the music selection being played, and the categorization of the music selection being played as one the user likes, wherein: the vehicle includes another user; the input from the biometric sensor comprises biometric information of the user and the other user; and determining overlapping music selections liked by both the user and the other user.

15. The article of manufacture of claim 14, wherein the method steps further comprise:
    detecting a conversation between the user and another occupant in the vehicle; and
    decreasing a volume of the music selection being played based on the detection of the conversation.

16. An apparatus for using biometrics to select music preferences for a user in a vehicle, comprising:
    a memory; and
    a processor coupled to the memory and configured to execute code stored in the memory for:
        monitoring the vehicle for inputs from a plurality of biometric sensors;
        determining whether any inputs from the biometric sensors have been detected;
        determining whether a music selection is being played;
        interpreting the inputs from the biometric sensors to develop models of biometric data and to predict whether the inputs from the biometric sensor indicate satisfaction with the music selection being played;
        applying and analyzing the models of the biometric data on a filter;
        outputting a prediction of music selections for the user based on the models, wherein the models are developed from reaction variant patterns;
        selecting another music selection other than the music selection being played based on the interpretation of the inputs from the biometric sensors and the prediction of music selections;
        categorizing the music selection being played as one a user likes or dislikes based on the interpretation of the inputs from the biometric sensors and the models;
        playing the other music selection in place of the music selection being played in response to a determination that the inputs from the biometric sensors indicate dissatisfaction with the music selection being played, and the categorization of the music selection being played as one the user dislikes;
        playing the other music selection after the music selection being played ends in response to a determination that the inputs from the biometric sensors indicate satisfaction with the music selection being played, and the categorization of the music selection being played as one the user likes;
        respectively categorizing existing reaction variant patterns under different music selections;
        detecting uncategorized reaction variant patterns;
        determining to which categorized reaction variant patterns the uncategorized reaction variant patterns are closest; and
        categorizing the uncategorized reaction variant patterns under the same music selections as their closest categorized reaction variant patterns.

* * * * *